US005858888A

United States Patent [19]

Underwood et al.

[11] Patent Number: 5,858,888

[45] Date of Patent: Jan. 12, 1999

[54] FIREFIGHTER GARMENT UTILIZING IMPROVED HIGH-LUBRICITY LINING MATERIAL

[75] Inventors: Joey K. Underwood, Greenville; J. Russell Hayes, Piedmont, both of S.C.

[73] Assignee: Safety Components Fabric Technologies, Inc., Greenville, S.C.

[21] Appl. No.: 683,578

[22] Filed: Jul. 15, 1996

[51] Int. Cl.[6] .................... B32B 27/00

[52] U.S. Cl. .................... 442/286; 2/69; 139/420 A; 442/208

[58] Field of Search .................... 442/203, 206, 442/208; 139/420 A; 2/2, 69, 81

[56] References Cited

U.S. PATENT DOCUMENTS 5,323,815 6/1994 Barbeau et al. .

5,539,928 7/1996 Aldridge .

OTHER PUBLICATIONS

A brochure published by DuPont Company entitled "What Would Happen if DuPont Nomex® and Kevlar® Were Missing From Your Turnouts?: You'd Be Unprotected."

*Primary Examiner*—James J. Bell

*Attorney, Agent, or Firm*—Dority & Manning

[57] ABSTRACT

A protective garment of the type typically worn by firefighters includes an improved liner assembly. The liner assembly comprises a lining fabric made from multifilament yarns in one weave direction and spun yarns in the other weave direction. The yarns are woven together using a satin weave to produce a first side of higher lubricity and a second side of lesser lubricity. The higher lubricity side forms an outer surface of the liner assembly to reduce friction otherwise caused by rubbing against adjacent surfaces, such as the firefighter's clothing.

9 Claims, 3 Drawing Sheets

FIREFIGHTER GARMENT UTILIZING IMPROVED HIGH-LUBRICITY LINING MATERIAL

BACKGROUND OF THE INVENTION

The present invention relates generally to protective garments such as the type which may be used by firefighters. More particularly, the invention relates to a protective garment having an improved high-lubricity inner lining.

Firefighter garments are generally constructed having a number of discrete layers. Typically, these layers include an outer shell, a moisture barrier layer, a thermal barrier layer and an inner lining (or face cloth). The layers are generally made from appropriate thermally-resistant materials to provide protection against heat and flame.

Various fabrics have been utilized in the past to produce the inner lining. One such fabric, which has enjoyed widespread use for this purpose, is often referred to as "pajama check." This fabric is made from warp and fill yarns of spun aramid fibers woven together into a ripstop weave.

In part due to the spun yarn, "pajama check" fabric generally exhibits a relatively low lubricity characteristic. In other words, a lining made from pajama check fabric will not be very "slick." As such, the lining may cause friction as it rubs against adjacent surfaces, such as the clothing worn by the firefighter under the protective garment. Because firefighting activities can be extremely strenuous, this friction may tend to fatigue the wearer.

Another fabric which has been utilized as an inner lining for protective garments is referred to as "Caldura." This fabric is made from warp yarns of spun aramid fibers and fill yarns of multifilament aramid fibers. The yarns are woven together into a twill weave that produces the characteristic "twill lines" exhibited in such a construction.

In order to reduce the rubbing friction described above, attempts have recently been made to produce inner linings having high-lubricity characteristics. One such fabric is described in U.S. Pat. No. 5,323,815 to Barbeau, et al. This patent shows an inner lining fabric constructed of multifilament aramid yarns in both the warp and fill directions. Because multifilament yarns tend to be "slicker" than spun yarns, a fabric made entirely from multifilament yarn will typically have greater lubricity than the other fabrics discussed above.

While this construction does provide an inner lining having the desired high-lubricity qualities, the use of multifilament yarns in both directions leads to a number of drawbacks. For example, multifilament yarns tend to be more expensive than spun yarns. In addition, the industry's capacity to produce multifilament aramid yarns has often been limited.

SUMMARY OF THE INVENTION

The present invention recognizes and addresses the foregoing disadvantages, and others of prior art constructions and methods. Accordingly, it is an object of the present invention to provide an improved protective garment suitable for use by a firefighter.

It is a more particular object of the present invention to provide a protective garment utilizing an improved high-lubricity inner lining material.

It is also an object of the present invention to provide an improved liner assembly for use in a protective garment.

It is also an object of the present invention to provide an improved textile material suitable for use as a lining fabric in a protective garment.

Some of these objects are achieved by a protective garment suitable for use by a firefighter. The protective garment includes an outer shell configured to cover and protect a predetermined portion of a wearer's body. An inner lining is located inside of the outer shell and has a first side of greater lubricity and a second side of lesser lubricity. The inner lining is adapted such that the first side thereof will be adjacent to the wearer's body during use.

The inner lining comprises a predetermined textile material constructed from warp yarns and fill yarns having thermally-resistant characteristics, such as yarns made from aramid fibers. The warp yarns and fill yarns are woven together in a suitable satin weave. Preferably, the warp yarns are multifilament yarns and the fill yarns are spun yarns, the first side of the textile material thus being a warp side thereof.

The garment may further include a moisture barrier layer located adjacent to the second side of the inner lining. A thermally-resistant felt layer may also be located between the outer shell and the inner lining to inhibit transmission of heat from an ambient environment to the wearer's body.

Other objects of the invention are achieved by a removable liner assembly for use in a protective garment. The liner assembly comprises first and second lining layers connected together about their respective peripheries to form an inner cavity. A thermal barrier layer is positioned between the lining layers inside of the inner cavity. A moisture barrier layer is also provided, located adjacent one of the lining layers.

Each of the lining layers comprises a predetermined textile material constructed from warp yarns and fill yarns having thermally-resistant characteristics. The warp yarns and fill yarns are woven together in a satin weave to produce a first side of greater lubricity and a second side of lesser lubricity. Respective second sides of the lining layers are opposed to one another on an inside of the inner cavity such that the first sides thereof will form an outer surface of the liner assembly.

In presently preferred embodiments, the thermal barrier layer comprises a felt constructed of thermally resistant fibers. The felt may be quilted to at least one of the lining layers by a plurality of crisscrossing stitch lines. Additionally, the moisture barrier layer may comprise a membrane adhered to a second side of one of the lining layers. The membrane may be of a type substantially impermeable to liquid water but permeable to water vapor.

Additional objects of the invention are achieved by a textile material suitable for use as a lining fabric in a protective garment. The textile material comprises a plurality of warp yarns and fill yarns having thermally-resistant characteristics. The warp yarns and fill yarns are woven together in a satin weave.

In presently preferred embodiments, the warp yarns are multifilament yarns and the fill yarns are spun yarns such that a warp side of the textile material has a greater lubricity and a fill side of the textile material has a lesser lubricity. The textile material preferably has a weight of no greater than approximately 4.0 ounces per square yard.

To further enhance the lubricity characteristics of the warp side, embodiments may be constructed wherein the warp yarns contribute at least approximately fifty-five (55) percent of the overall weight of the textile material. A 200 denier warp yarn and a 37 singles fill yarn has been found suitable for this purpose. A typical construction using such yarns may yield a thread count having more ends per inch than picks per inch.

Furthermore, a membrane substantially impermeable to liquid water but permeable to water vapor may be adhered to the fill side of the textile material.

Other objects, features and aspects of the present invention are discussed in greater detail below.

BRIEF DESCRIPTIONS OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
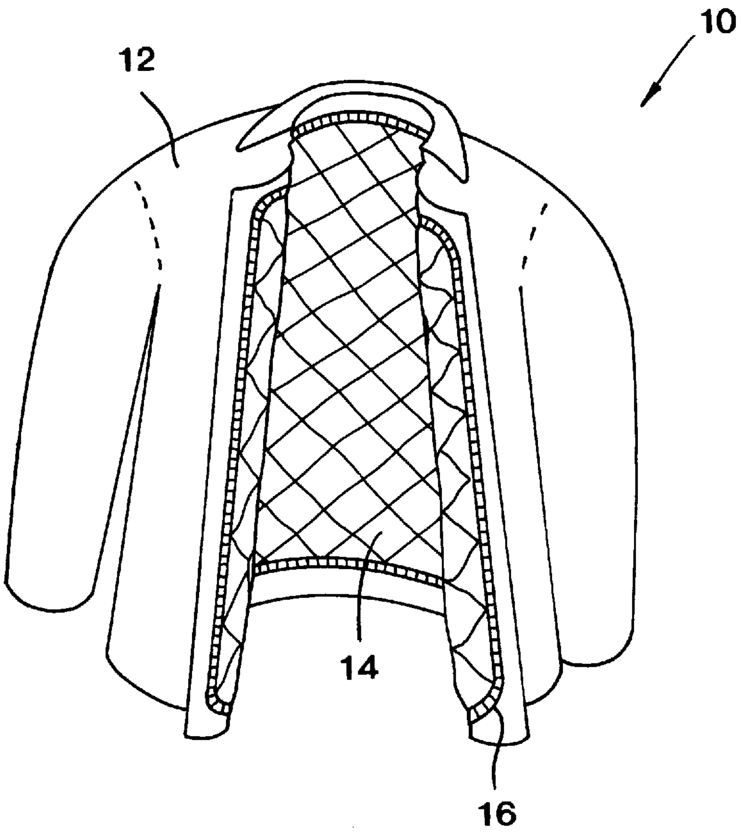
FIG. 1 is a perspective view of an improved protective garment constructed in accordance with the present invention.

Repeat use of reference characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 illustrates an improved protective garment 10 constructed in accordance with the present invention. Garment 10 includes a relatively tough outer shell 12 having a liner assembly 14 located therein. Outer shell 12 and liner assembly 14 together function to protect a wearer from heat and flame such as may be encountered during firefighting activities.

In the illustrated embodiment, liner assembly 14 is constructed as a separate unit that may be removed from outer shell 12. A zipper 16 is provided in this case to maintain liner assembly 14 in position within outer shell 12 as shown. It should be appreciated, however, that other suitable means of attachment, such as various hook and pile arrangements, may also be utilized for this purpose.

Figure 2:
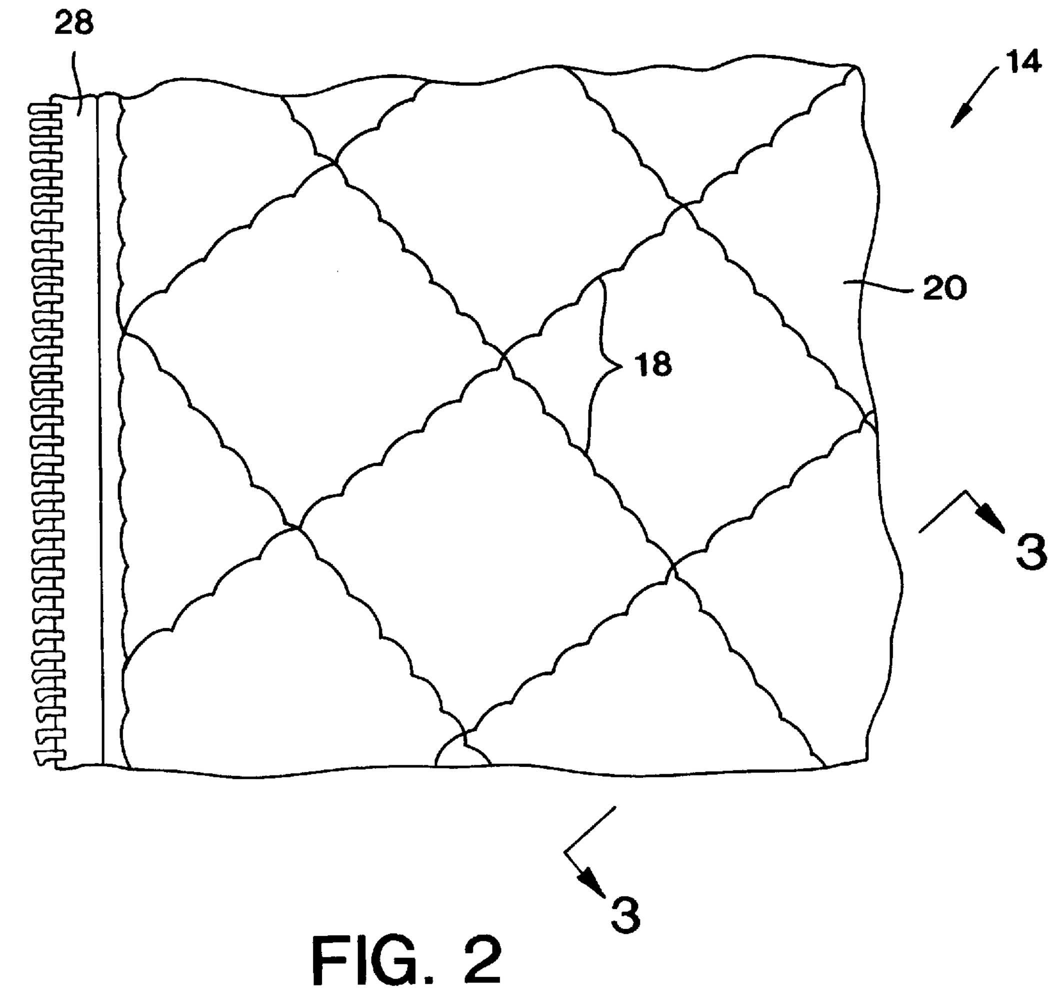
FIG. 2 is an enlarged fragmentary view of a portion of an inner liner assembly such as may be utilized with the protective garment of FIG. 1.
Figure 3:
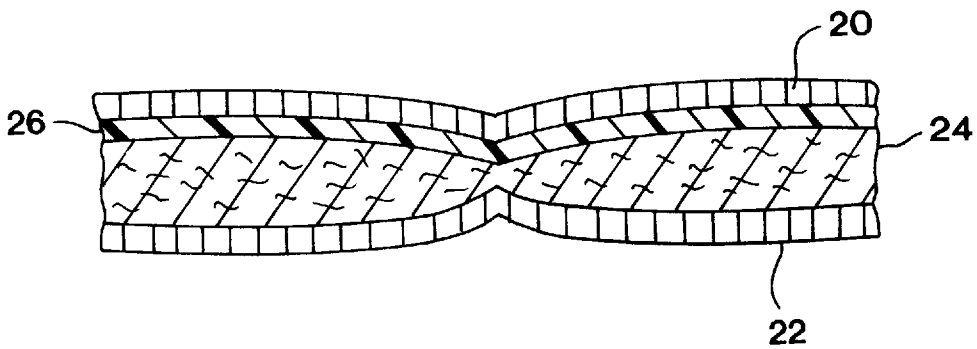
FIG. 3 is a cross-sectional view as taken along lines 3—3 of FIG. 2.

The construction of liner assembly 14 may be most easily explained with reference to FIGS. 2 and 3. As can be seen, liner assembly 14 includes a plurality of material layers quilted together by crisscrossing stitch lines 18. The outermost layers, i.e., lining layers 20 and 22, are connected together about their respective peripheries to form an inner cavity. A thermal barrier layer 24 and a moisture barrier layer 26 are located within the inner cavity, as shown. The half of zipper 16 that remains connected to liner assembly 14 when removed is indicated at 28.

Typically, lining layer 20 will be adjacent the wearer's body during use, whereas lining layer 22 will be immediately inside of outer shell 12. As will be described more fully below, lining layers 20 and 22 are made from a textile material having a first side of higher lubricity and a second side of lesser lubricity. The higher lubricity sides are directed outwardly such that the outer surface of liner assembly 14 will be relatively "slick." This construction desirably reduces the friction that may otherwise be produced by rubbing against the wearer's clothing. Friction between the liner assembly 14 and outer shell 12 may also be reduced in this manner.

In the illustrated embodiment, an aramid felt, such as a felt produced from DuPont Nomex® fibers, is utilized to provide thermal barrier layer 24. The felt functions as an insulator to inhibit transfer of heat from the ambient environment to the wearer.

Moisture barrier layer 26 is preferably a suitable polymeric membrane that is impermeable to liquid water but is permeable to water vapor. As such, exterior water (such as from a firefighter's water hose) will not penetrate the interior of garment 10, but perspiration from the firefighter can escape. Suitable membranes of this type are distributed by W. L. Gore & Associates under the trademark Gore-Tex.

As described above, the higher lubricity side of lining layer 20 forms an outer surface of liner assembly 14. Thus, the membrane of moisture barrier layer 26 is adhered is the lower lubricity side of lining layer 20. This is advantageous because membranes of this type will generally adhere more readily to a rougher surface than to one which is smooth.

Figure 4:
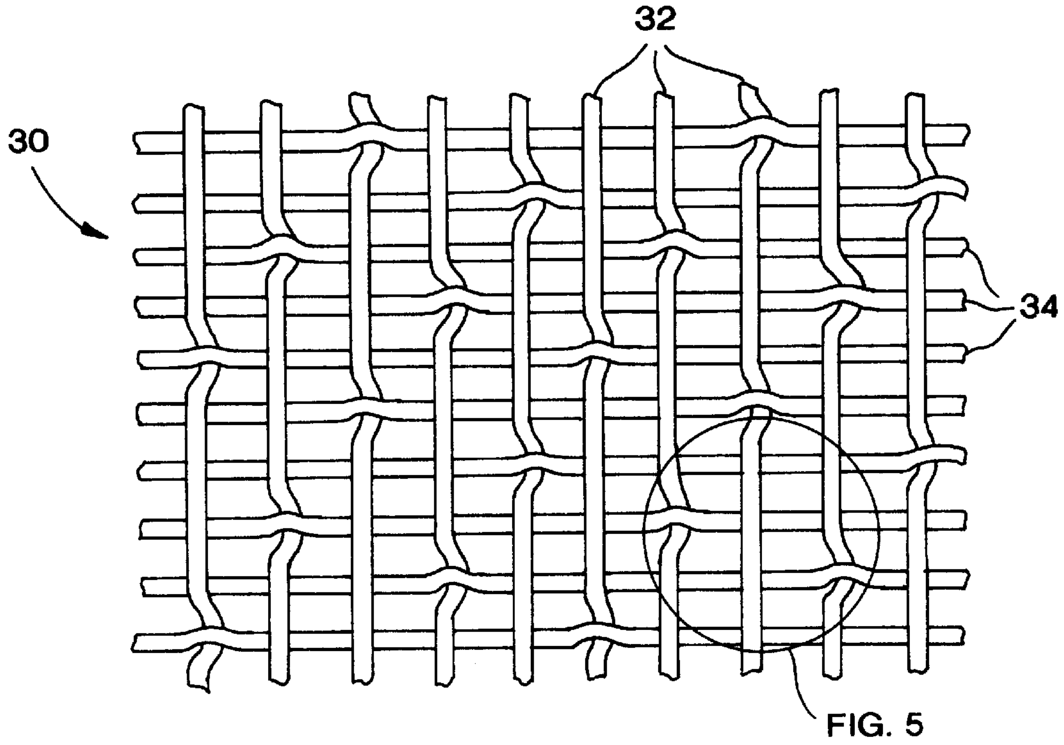
FIG. 4 is an enlarged view of a textile material which may be used as a lining layer in the liner assembly of FIG. 2.
Figure 5:
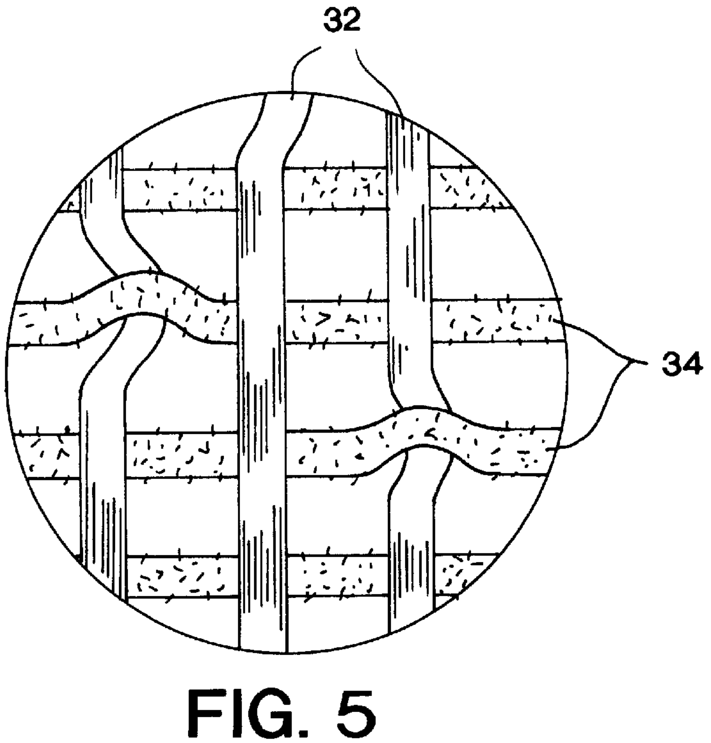
FIG. 5 is an enlarged view on an even greater scale of the area so indicated in FIG. 4.

FIGS. 4 and 5 illustrate an improved textile material 30 such as may be used to construct lining layers 20 and 22. As shown, textile material 30 includes a plurality of warp yarns 32 interwoven with a plurality of fill yarns 34. In this case, warp yarns 32 are multifilament yarns, whereas fill yarns 34 are spun yarns. Preferably, warp yarns 32 and fill yarns 34 are each constructed from thermally resistant fibers, such as DuPont Nomex® aramid fibers.

In order to achieve the desirable qualities discussed above, warp yarns 32 and fill yarns 34 are woven together utilizing a satin weave. In a satin weave, the interlacing of each warp yarn is at least one fill yarn apart from the interlacing of either of the two warp yarns next to it. The points of interlacing do not produce an unbroken line (such as with a twill weave), but are scattered about over the weave. The interlacings of the warp yarns are thus hidden by adjacent floats.

As a result of this weave, warp yarns 32 will mostly appear on one side of textile material 30, whereas fill yarns 34 will mostly appear on the backside thereof. These two sides may be referred to as the warp side and fill side, respectively.

Because warp yarns 32 are multifilament yarns, the warp side will tend to have a lustrous surface of relatively high lubricity. The fill side will have a lesser lubricity, since it is dominated by the spun yarns. The "scattered" interlacings of a satin weave enhance the lubricity difference between the respective sides in relation to what would generally be achieved using, for example, a twill weave.

The illustrated construction utilizes a particular satin weave referred to as "five shaft" satin. As a result of this weave, each warp yarn 32 crosses over four fill yarns 34 before interlacing with the fifth. An adjacent warp yarn 32 has the same interlace pattern, but is offset by two fill yarns 34, as clearly illustrated in FIG. 4.

Assuming a square weave and equal yarns in both directions, a five shaft satin will produce a fabric in which about eighty (80) percent of the surface area of the "warp side" will be contributed by the warp yarns. Likewise, about eighty (80) percent of the surface area of the fill side will be contributed by the fill yarns.

An even greater ratio of multifilament to spun surface may be achieved on the warp side if larger yarns are utilized for the warp yarns than are utilized for the fill yarns. Thus, presently preferred embodiment utilize warp yarns contributing at least fifty-five (55) percent of the overall weight of textile material 30.

A weave having a higher count of warp yarn to fill yarn will also tend to increase the ratio of multifilament to spun surface area. Thus, the number of warp threads per inch may exceed the number of fill threads per inch in some presently preferred embodiments.

Representative constructions of textile fabric 30 are given in the following Examples.

EXAMPLE I

Warp Yarn: 200/100/5TZ Bright DuPont Nomex T-430

Fill Yarn: 37/1 √4.00Z DuPont Nomex

Ends: 68 per inch

Picks: 66 per inch

Weight: approx. 3.1 oz/sq. yd.

Weave: 5-shaft satin

EXAMPLE II

Ends: 72 per inch

Picks: 62 per inch

Other parameters same as above.

As can be seen, each of these examples utilizes a 200 denier multifilament warp yarn and a 37 singles spun yarn for the fill. It should be appreciated, however, that other yarn sizes may also be used, as appropriate in a particular application. In addition, it may be desirable in some applications to utilize a spun warp and a multifilament fill. In should also be appreciated that various satin weaves other than a "five-shaft" satin may also be utilized. For example, it may be appropriate in some embodiments to use a 7-shaft or 9-shaft satin or a crowfoot satin such as a 4-shaft crowfoot satin.

Thus, while preferred embodiments of the invention have been shown and described, modifications and variations may be made thereto by those of ordinary skill in the art without departing from the spirit and scope of the present invention. It will be further appreciated that aspects of the various embodiments may be interchanged both in whole or in part. Additionally, those of ordinary skill in the art will appreciate that the foregoing description is by way of example only and is not intended to be limitative of the invention so further described in such appended claims.

What is claimed is:

1. A textile material suitable for use as a lining fabric in a protective garment, said material comprising a plurality of warp yarns and fill yarns having thermally-resistant characteristics, one of said warp yarns and fill yarns being formed of multifilament yarns and another of said warp yarns and fill yarns being formed of spun yarns, said warp yarns and said fill yarns being woven together in a satin weave such that a first side of said textile material has a greater lubricity and a second side of said textile material has a lesser lubricity.

2. A textile material as set forth in claim 1, wherein said warp yarns are multifilament yarns and said fill yarns are spun yarns such that a warp side of said textile material has a greater lubricity and a fill side of said textile material has a lesser lubricity.

3. A textile material as set forth in claim 1, having a weight of no greater than approximately 4.0 ounces per square yard.

4. A textile material as set forth in claim 3, wherein said warp yarns contribute at least approximately 55 percent of a weight of said textile material.

5. A textile material as set forth in claim 4, wherein said warp yarns are approximately 200 denier yarns and said fill yarns are approximately 37 singles yarns.

6. A textile material as set forth in claim 2, having a warp thread count exceeding a fill thread count thereof.

7. A textile material as set forth in claim 2, wherein said satin weave is a five (5) shaft satin weave.

8. A textile material as set forth in claim 2, wherein said warp yarns and said fill yarns are each constructed of aramid fibers.

9. A textile material as set forth in claim 2, further comprising a membrane adhered to said fill side thereof, said membrane being substantially impermeable to liquid water but permeable to water vapor.

* * * * *